Aug. 25, 1936.  R. C. L. P. TURGOT  2,051,920
BRAKE ADJUSTING DEVICE
Filed June 2, 1931   2 Sheets-Sheet 1

Inventor
Robert-Charles-Louis-Pierre Turgot.

By  M. W. McConkey.
Attorney

Aug. 25, 1936.  R. C. L. P. TURGOT  2,051,920
BRAKE ADJUSTING DEVICE
Filed June 2, 1931   2 Sheets-Sheet 2

Inventor
Robert-Charles-Louis-Pierre Turgot.
By
M. W. McConkey
Attorney

Patented Aug. 25, 1936

2,051,920

UNITED STATES PATENT OFFICE 2,051,920

BRAKE ADJUSTING DEVICE

Robert Charles Louis Pierre Turgot, Paris, France, assignor to Bendix Brake Company, South Bend, Ind., a corporation of Illinois Application June 2, 1931, Serial No. 541,693
In France June 2, 1930

12 Claims. (Cl. 188—79.5)

The present invention relates to brakes and more particularly to means for automatically effecting the adjustment of brake shoes with respect to the brake drum.

An object of the present invention is to provide improved means for automatically adjusting the position of the brake shoes in accordance with the wear on the facings carried thereby.

Another object of the invention is to provide improved adjusting means actuated by the brake operating movement of the shoes themselves.

Another object of the invention is to provide novel mounting means for the brake shoes which will be automatically displaced by the movement of the brake shoes or the controlling means therefor and in proportion to the play between the facing members and the drum.

A further object of the invention is to provide means whereby the automatic displacement of the mounting means for the brake shoes will effect adjusting movement of the shoes with respect to the drum.

A still further object of the invention is to provide automatic means for taking up the play, which occurs during adjustment of the brake shoes, between the shoes and their co-operating controlling devices.

Other objects and features of novelty will be apparent from the following detailed description when taken in connection with the accompanying drawings. It is to be expressly understood however, that the drawings are for purposes of illustration only and are not designed as a definition of the limits of the invention, reference being had for this purpose to the appended claims.

In the drawings wherein similar reference characters refer to like parts throughout the several views.

Figure 1:
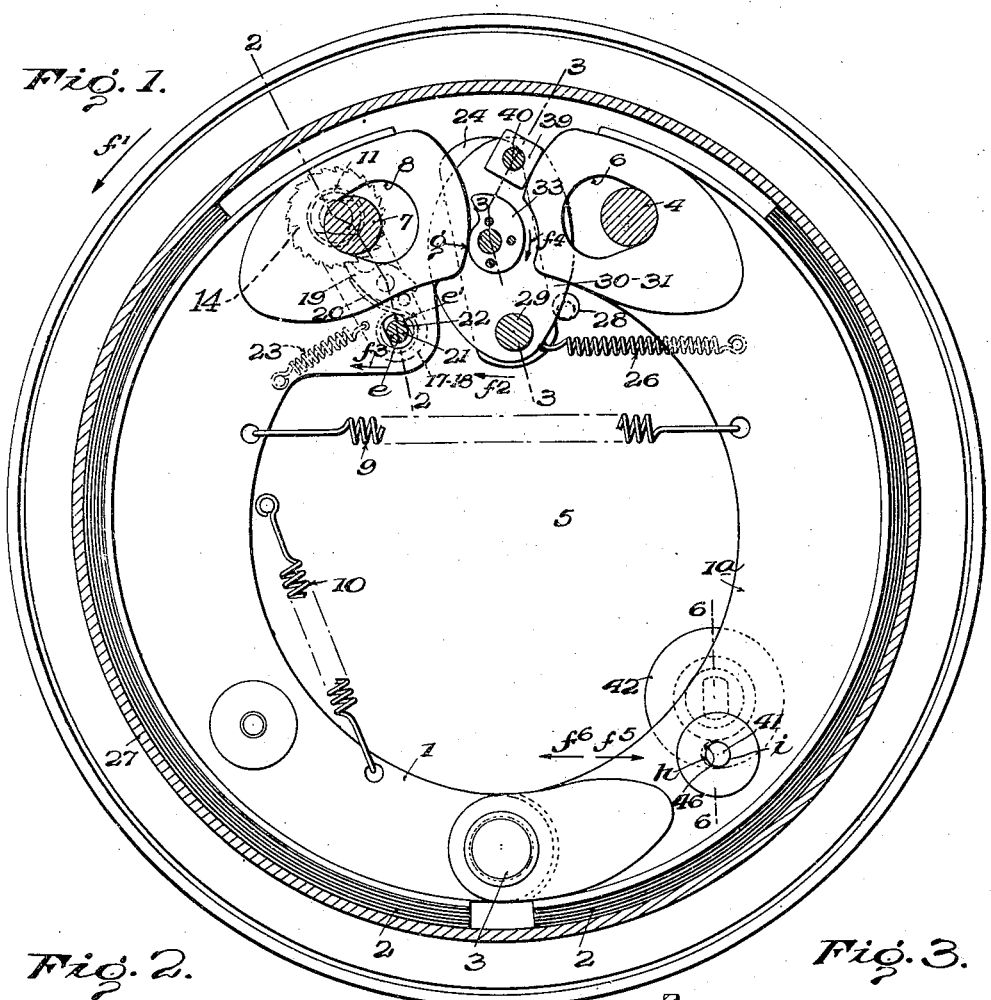
Fig. 1 is an elevational view, with a section of the brake drum, of a regulating device in conformity to the invention as employed with a motor vehicle brake.

In the construction shown in Fig. 1, the brake comprises two expanding members or shoes 1 and 1ª of semi-circular shape and of T section, which are provided with facing members 2 and may be applied against a brake drum 27. The said shoes are pivoted together at one end upon a common axle 3. The outer end of one of the brake shoes 1ª is pivoted to an anchor 4 secured to the brake disk 5, and is enabled to move transversely to said anchor. For this purpose, the brake shoe 1ª has an aperture 6 of larger diameter than the said anchor which extends through it, and the end of said aperture is cut out on the side farthest from the end of the shoe in such manner as to form a recess in which the said anchor will be situated when the shoe is in the inoperative position. The other shoe 1 is pivoted in like manner to an anchor 7 extending through an aperture 8 in said shoe. A spring 9 is attached at its respective ends to the shoes 1 and 1ª, and a spring 10 attached at one end to the brake disk 5 and at the other end to the shoe 1, and said springs urge the shoes into the inoperative position as shown in the figure, in which the anchors 4 and 7 are situated at the rear ends of the apertures 6 and 8, respectively.

Figure 2:
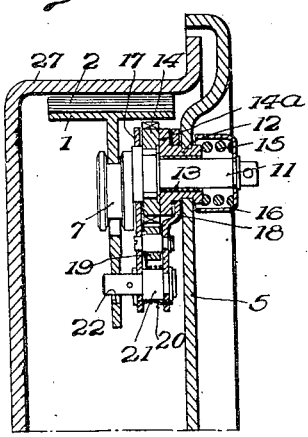
Fig. 2 is a section of the same on the line 2—2 of Fig. 1.
Figure 3:
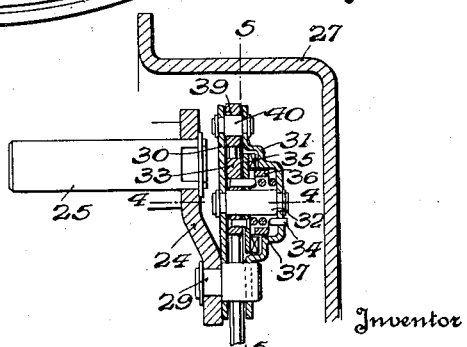
Fig. 3 is a section, on the line 3—3 of Fig. 1, of the device for controlling the brake shoes.
Figure 4:
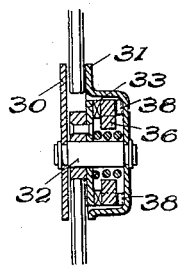
Fig. 4 is a section of said device on the line 4—4 of Fig. 3.
Figure 5:
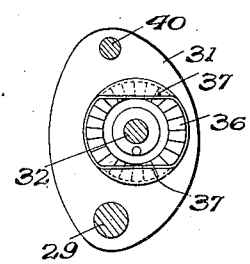
Fig. 5 is a section of the same device on the line 5—5 of Fig. 3.
Figure 6:
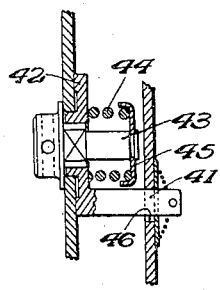
Fig. 6 is a section of an automatically adjustable stop, on the line 6—6 of Fig. 1.

The anchor 7 is secured to a shank 11 which is eccentric with reference to the anchor 7 (Fig. 2); said shank 11 is rotatable in a bearing 12 which is riveted to the brake disk 5. A bushing 13 of graphite-covered bronze is mounted between the bearing 12 and said shank 11 to prevent all gripping of said shank in its bearing, and thus no lubrication is required. A ratchet wheel 14 is mounted on the shank 11.

A suitable elastic device, for instance a strong spring 15, applies the ratchet wheel, by its face 14ª, against the bearing 12 with great pressure. In the construction shown in Fig. 2, said spring is contained in a socket 16 which is coaxial with the shank 11 and is held, at the end of said shank, against all lengthwise motion; said spring is in contact at one end with the outer end of the bearing 12 and at the other end with the inner side of the said socket 16.

Said ratchet wheel is mounted between two plates 17 and 18; the plate 17 is rotatable on the shank 11 and the plate 18 is rotatable on the bearing 12 concentrically with the shank 11. Upon and between the two plates 17—18 is pivotally mounted a pawl 19, whose pointed end is urged against the ratchet wheel 14 by a spring 20 (Figs. 1 and 2); said spring is mounted upon a pin 21 which is secured by riveting to the plate 18 and extends through the plate 17, also passing through the shoe 1 by means of a slot 22 in this latter, thus allowing a slight lateral motion of said pin 21 relatively to the shoe 1. A small spring 23 is attached to the shoe 1 and to the plate 17, and in the inoperative position it maintains the pin 21 against the edge $e$ of the slot 22; said spring is as weak as possible, to prevent all movement of the shoe 1 under its action, and it has only a sufficient force to hold the pin 21 against the edge $e$ of the slot 22.

A suitable device for the control of the shoes 1 and 1ᵃ is employed, which provides for the automatic taking up of the play due to the separation of the shoes, by virtue of the regulating action. As shown in Figs. 1, 3, 4 and 5, said controlling device comprises a lever 24 secured to the end of an actuating shaft 25 extending through the brake disk 5. A spring 26 attached at one end to said disk and at the other to the outer end of the lever 24 urges said lever against an adjustable eccentric stop 28 mounted on the brake disk 5. If desired, said spring may be mounted on the brake-controlling device.

An axle 29 (Fig. 3) is secured to the free end of the lever 24, and upon said axle are rotatable two disks 30—31. An axle 32 is riveted to said disks, and it carries a cam 33 loosely mounted thereon. A spring 34, subject to torsion, is attached at one end to the disk 31 and at the other end to the cam 33, and it urges said cam in the direction of the arrow $f^4$ in such manner that said cam will remain in contact with the shoe 1. A ratchet wheel 35 is riveted to said cam (Figs. 3 and 5) and said wheel is in gear engagement with a portion of a ratchet wheel 36, the direction of the teeth being such that the cam 33 can rotate only in the direction of the arrow $f^4$; said wheel 36 has two flat parts 37 (Figs. 3 and 5) and is slidable in the disk 31 without rotation. Two small spring strips 38 are mounted between said wheel 36 and the inner end of the disk 31 (Fig. 4) and they urge the wheel 36 against the wheel 35.

A contact block 39 is loosely mounted on an axle 40 riveted to said disks 30 and 31 and situated between them (Figs. 1 and 3); said contact block 39 is normally in contact with the end of the shoe 1ᵃ when said shoe is in the inoperative position, that is to say, when it is held against the anchor 4 which serves as a stop.

The brake is further provided with an automatically adjustable stop, and in the inoperative position said stop assures the centering of the shoes 1 and 1ᵃ and prevents all loose motion of the shoes in the direction of the arrows $f^3$ and $f^3$; said stop consists of an eccentric stud 41 mounted on a disk 42 secured to the brake disk 5, preferably through the medium of an axle 43 to which the said disk 42 is keyed. The axle 43 is rotatable in the brake disk 5. A suitable elastic device, such as a strong spring 44, is in contact at one end with a member 45 secured to the axle 43 and at the other end to the disk 42, and it strongly presses said disk 42 against the brake disk 5. The stud 41 extends through an aperture 46 in the shoe 1ᵃ. The ratio between the forces of the springs 10 and 44 is such that the couple of the spring 10 will be less than the couple due to the friction of the disk 42 upon the brake disk 5, and thus when the shoe 1ᵃ is brought back by the spring 10, said shoe will not move the stud 41 in the direction of the arrow $f^3$.

In the construction herein represented, the diameter of the aperture 46 exceeds the diameter of the stud 41 by a sufficient amount to practically obtain the proper play between the facing member 2 and the drum 27, which play is determined in advance.

The operation of the said brake is as follows. With the brake drum 27 rotating in the direction of the arrow $f^1$ (Fig. 1) if a braking action is exerted upon the lever 24, this causes the rotation of said lever and hence the rotation of the disks 30 and 31 in the direction of the arrow $f^2$; in this movement, the cam 33 bears against the shoe 1, and the contact block 39 against the shoe 1ᵃ, thus separating the shoes, which now press upon the brake drum 27.

The brake drum draws forward the said shoes in the direction of the arrow $f^1$, and thus the pair of brake shoes will pivot upon the anchor 4. The shoe 1 moves the pin 21 by means of the edge $e'$ of the slot 22 (Figs. 1 and 2), thus turning the plates 17 and 18 in the direction of the arrow $f^3$ about the shank 11; in this movement, the pawl 19 actuates the ratchet wheel 14, and by rotating said wheel it displaces the anchor 7 by a rotation about the shank 11 in the direction of the arrow $f^3$. This displacement of the anchor 7 is obviously proportional to the displacement of the shoe 1, and hence to its play. When the braking action ceases, the shoe 1 is brought back by the springs 9 and 10 and it drives back the pawl 19 until the shoe makes contact with the anchor 7, against which it now rests. As the friction couple of the ratchet wheel 14 upon the bearing 12 exceeds the total couple of the springs 9 and 10, the anchor 7 will not be actuated by the brake shoe. Since wear has occurred due to braking, the anchor 7 is displaced, as above indicated, in the direction of the arrow $f^3$, and hence the return stroke of the shoes 1 and 1ᵃ will be less than the forward stroke, which latter is equal to the stroke determined by the play between the facing members 2 and the drum 27 to which is added the wear of the said facing members. In this manner the wear will always be constant. The width of the slot 22 exceeds the diameter of the pin 21, in order to provide for this play by delaying by a certain amount the drive of the pawl 19 by the shoe 1.

Since the stop anchor 7 of the shoe 1 is separated from the cam 33 by reason of the wear, the play between said cam and the shoe 1 increases. This play is taken up automatically by means of the aforesaid arrangement. In fact, when this play increases, due to the back motion of the anchor 7 occasioned by the wear of the facing members, the cam 33 which is urged by the spring 34 will turn in the direction of the arrow $f^4$ until it makes contact with the shoe 1 at $g$, and the lever 24 comes against the stop 28, since it is drawn back by the spring 26.

When rotating in the direction of the arrow $f^4$, the cam 33 drives back—by the inclined part of the teeth of the wheel 35—the portion of wheel 36 which is slidable without rotation in the plate 31, while compressing the two small springs 38. This portion of wheel 36 returns to its initial position when the cam 33 has turned by one tooth, thus preventing the said cam from returning to the rear or contrary to the arrow $f^4$. It should be observed that in order that the said cam may operate, the force of compression of the two small springs must be small in comparison to the torsion couple of the spring 34.

In view of the number of variable factors which are employed, it will be observed that it is easy to practically obtain an adjustment having a minute accuracy, and thus a practically constant adjustment.

The adjustment of the stop 41 is automatically effected during the braking action. In fact, when the shoe 1ª moves in the direction of the arrow f⁵ by the indirect action of the brake control, it moves the pin 41 by its face h until the facing member 2 makes contact with the drum 27. When the braking effort ceases, the spring 10 brings back the shoe 1ª which returns to the rear until it meets the face i of the pin 46 which it is unable to move, since the friction couple of the disk 42 on the brake disk 5 exceeds the couple of the reaction spring 10. This return stroke is proportional to the difference between the diameters of the aperture 46 and the pin 41 and is thus constant.

Figure 7:
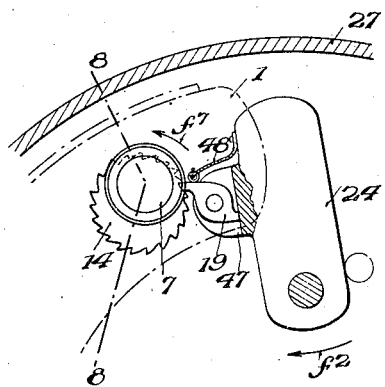
Fig. 7 is an elevational view of a modified form of the device controlling the adjustment of the brake shoes.
Figure 8:
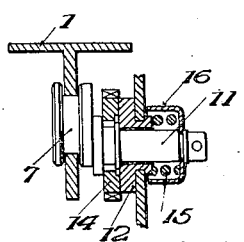
Fig. 8 is a section of the same on the line 8—8 of Fig. 7.

Figs. 7 and 8 show a modified arrangement of the device for regulating the brake shoes according to the wear of the facing members, and herein the displacement of the pawl 19 which acts by means of the ratchet wheel 14 upon the eccentric axle 7, is effected directly by the operating lever 24. The braking actuation of the shoes is of course accomplished by contact elements similar to the block 39 and cam 33 both mounted on lever discs similar to the lever discs 30 and 31. For this purpose, the pawl 19 is pivoted in a forked part 47 of said lever 24; a spring 48 is attached at one end to the lever 24 and bears at its other end upon the pawl 19, thus holding the point of the pawl against the ratchet wheel 14.

When a braking effort is exerted so as to bring the shoe 1 against the brake drum 27, the lever 24 will turn in the direction of the arrow f², thus moving the pawl 19 which rotates the ratchet wheel 14 in the direction of the arrow f⁷. The anchor 7 thus moves at the same time in the direction of this arrow f⁷. When the braking effort ceases, the shoe 1 will return to the rear by the action of the springs 9—10 (Fig. 1) until it makes contact with the anchor 7 which is held in place due to the friction couple of the ratchet wheel 14 on the bearing 12. As in the preceding case, the device is so arranged that the shoe 1 will move through a distance corresponding to the normal play between the facing members 2 and the drum 27, before the pawl 19 acts upon the ratchet wheel 14, and thus the displacement of the anchor 7 will correspond solely to the play occasioned by the wear. This play, it will be seen, is due to the fact that upon each actuation, the pawl in rotating clockwise engages when in fully actuated position, a tooth of the ratchet. If actuation goes beyond this point, the ratchet is rotated, carrying the anchor with it. Upon brake release, and counterclockwise rotation of the pawl carrier the pawl slides freely upon the inclined surface of the adjacent tooth, and in the event the previous actuation movement was excessive, returns to a position to actuate the adjacent tooth upon subsequent brake actuation.

While there has been shown and described one embodiment of the invention, it is to be understood that the invention is not limited thereto. Various changes in the shapes, sizes and manner of assembling the various component parts may be resorted to without departing from the scope of the invention, as will occur to those skilled in the art. Reference will therefore be had to the appended claims for a definition of the limits of the invention.

What is claimed is:

1. A brake including a brake drum, a backing plate, a plurality of brake shoes, an eccentric pivotal connection between said shoes and said backing plate, a plurality of plates mounted on said pivot, a pin carried by said plates and extending loosely through one of said shoes, a ratchet rigid with said pivot, a pawl carried by said plates and cooperating with said ratchet, whereby brake-operating movement of said shoes will cause movement of said pawl to rotate said ratchet and pivot to effect adjustment of said shoes.

2. A brake including a brake drum, a plurality of brake shoes, a backing plate, a lever for operating said brake shoes, a pivotal connection between said shoes and said backing plate, a ratchet wheel carried by said pivot, a pawl co-operating with said ratchet wheel, a fork carried by said lever and carrying said pawl, whereby the displacement of the pawl will be proportional to the displacement of said lever.

3. A brake including a drum, a brake shoe, a backing plate, a cam for operating said shoes, an axle loosely carrying said cam, a controlling lever carrying said axle, an elastic device urging said cam into constant contact with said shoe, and a pawl for preventing rotation of the cam in the opposite direction.

4. In a brake as in claim 3, a ratchet wheel in engagement with said cam, a second ratchet wheel, an elastic device urging said ratchet wheels into facial contact, means for causing separation of said second ratchet wheel from said first ratchet wheel without rotation of said second ratchet wheel, and means restricting rotation of said first ratchet wheel to one direction only.

5. A brake comprising a drum, a plurality of shoes, controlling means for said shoes comprising a plurality of shoe engaging parts, means including an eccentric rotatable anchor for adjusting the position of the shoes with respect to the drum, and means for automatically shifting said shoe engaging parts relatively to each other to take up the play between said shoes and said controlling means occasioned by said adjustment.

6. A brake comprising a drum, a floating friction means having separable ends, anchoring means for said ends at least one of which has an automatic adjustment for wear, and spreading means having an automatic adjustment comprising separate shoe engaging parts engaging said separable ends, one of which parts is movable relatively to said spreading means to compensate for the adjustment of said anchoring means.

7. A brake comprising a drum, a floating friction means having spreadable ends, anchoring means for said ends including mechanism to automatically increase the effective anchor width to compensate for wear and maintain uniform brake release clearance, and actuating means having shoe engaging parts for spreading said ends including an automatic adjustment to increase the distance between the points of engagement of said parts with said shoes to compensate for the adjustment of said anchoring means.

8. A brake comprising a drum, a floating friction means having spreadable ends, anchoring means for said ends including mechanism to automatically increase the effective anchor width to compensate for wear and spreading means including mechanism to automatically adjust the effective width thereof in accordance with the adjustment of said anchor means without a corresponding change in position.

9. In a brake, an actuating means comprising a rotatable spreader, having two thrust parts and automatic adjustment mechanism operable relatively to shift said thrust parts to increase the effective width of said spreader without rotation thereof.

10. A brake comprising a drum, a brake shoe and anchor means therefor, means to automatically adjust said shoe for minimum clearance, and actuating means comprising a spreader having automatic adjustment mechanism for increasing the effective width thereof without rotation thereof.

11. A brake comprising a brake drum, a floating friction means therefor having spreadable adjacent ends, an anchor for each end, a cam actuator for engaging and spreading said ends, automatic adjustment means for shifting the effective position of one of said anchors to compensate for wear of said friction means and maintain substantially uniform brake release clearance between the friction means and said drum, and an engaging means on said cam actuator for engaging the end of the friction means adjacent the adjustable anchor, and means for automatically shifting said engaging means to compensate for increased spread between the ends of said friction means due to wear and the movement of the adjustable anchor.

12. An automatic brake adjusting means comprising a pair of relatively movable friction members of which one is mounted to be forced into engagement with the other, actuating means engageable with said first member, a stop engageable with an element of said first member to limit the separation of the members, automatic take-up means interposed between the first member and the actuating means, and a second automatic take-up for advancing said stop in accordance with the wear occurring between said members, one of said automatic take-up means comprising a spring actuated cam precluded from change by the first said member, except as wear takes place between said members.

ROBERT CHARLES LOUIS PIERRE TURGOT.